United States Patent
Dempsey, Jr. et al.

[15] 3,639,676
[45] Feb. 1, 1972

[54] FEEDER BUS DUCT WITH IMPROVED HOUSING STRUCTURE

[72] Inventors: George A. Dempsey, Jr.; Martin F. Koenig, both of Milwaukee, Wis.; Manuel Issa, deceased, late of Milwaukee, Wis.; Patrick T. Sheedy, administrator, Fox Point, Wis.

[73] Assignee: Cutler-Hammer, Inc., Milwaukee, Wis. by said Dempsey and said Koenig

[22] Filed: Nov. 27, 1970

[21] Appl. No.: 93,146

[52] U.S. Cl. ..........................................174/68 B, 174/99 B
[51] Int. Cl. ..................................................H02g 5/06
[58] Field of Search....................174/16 B, 68 B, 70 B, 71 B, 174/72 B, 88 B, 99 B, 99 E; 339/22 B

[56] References Cited

UNITED STATES PATENTS

| | | | |
|---|---|---|---|
| Re.26,310 | 11/1967 | Moodie et al. | 174/68 B |
| 3,012,218 | 12/1961 | Cataldo | 174/99 B X |
| 3,360,602 | 12/1967 | Harton | 174/68 B |
| 3,376,377 | 4/1968 | Fehr, Jr. | 174/72 B |
| 3,384,702 | 5/1968 | Stevens | 174/68 B |
| 3,444,311 | 5/1969 | Weimer et al. | 174/99 B X |
| 3,555,293 | 1/1971 | Shannon et al. | 174/68 B X |
| 3,571,488 | 3/1971 | Douglass | 174/88 B X |
| 3,584,138 | 6/1971 | Pritzen, Jr. | 174/68 B |

*Primary Examiner*—Laramie E. Askin
*Attorney*—Hugh R. Rather and William A. Autio

[57] ABSTRACT

A plurality of wide flat insulated bus bars are compressed in flatwise adjacent relationship between inwardly bowed aluminum side members and formed sheet metal edge caps. The side members have reflex portions formed along opposite edges which extend angularly outward and are cammed inward by rail portions on the caps to compress the sides substantially flat on the bus bars and bias the bus bars firmly together. The resiliently bowed sides and reflex portions compensate in assembly for an accumulation of tolerances in the bus bars and their insulation. Bolts are used to secure the sides and caps together, and exaggerated clearance openings are provided for the bolts to permit the caps to be forced firmly against the bus bars with the bolts loosely in place before being finally secured.

9 Claims, 5 Drawing Figures

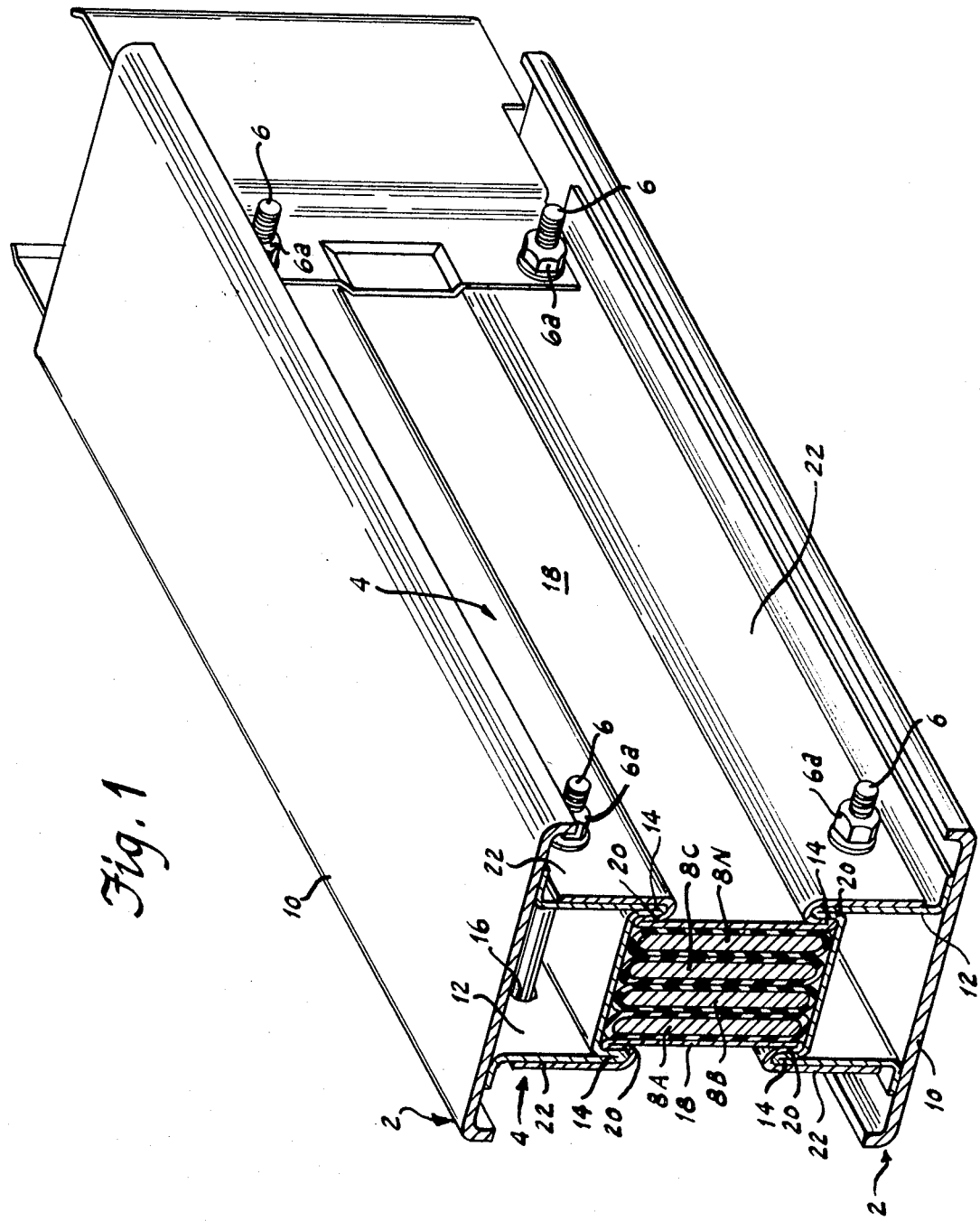

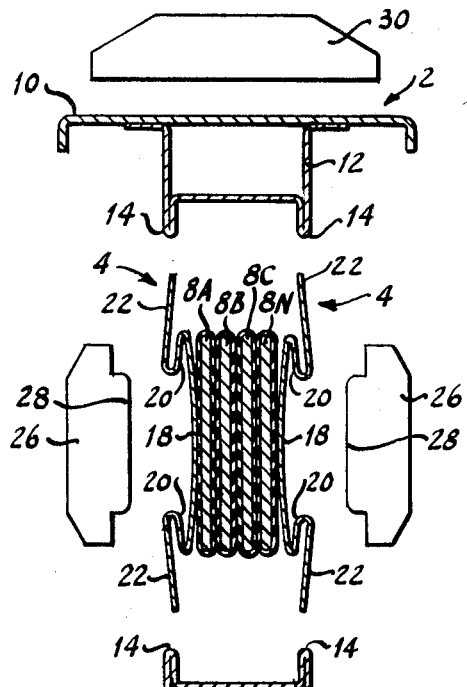
Fig. 2a
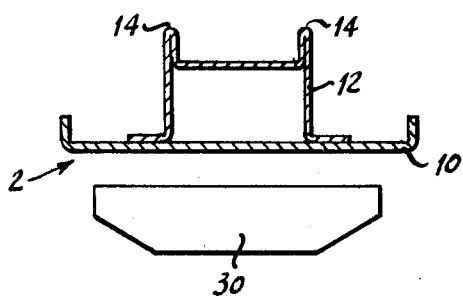
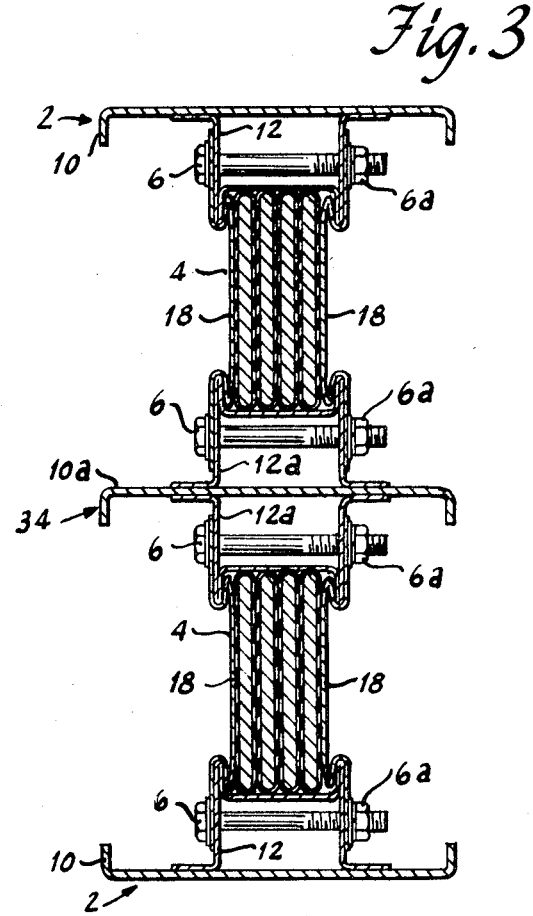
Fig. 3

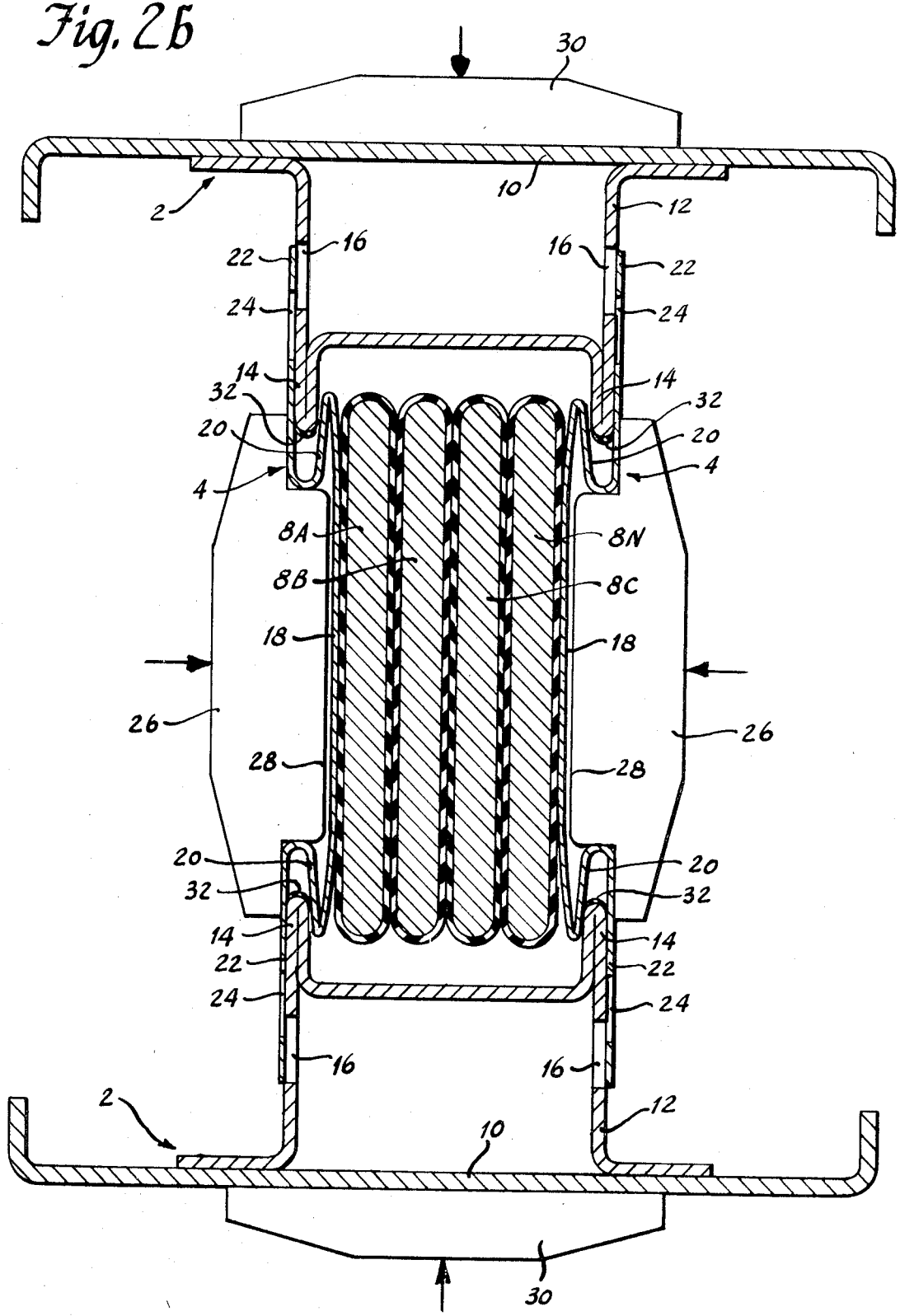

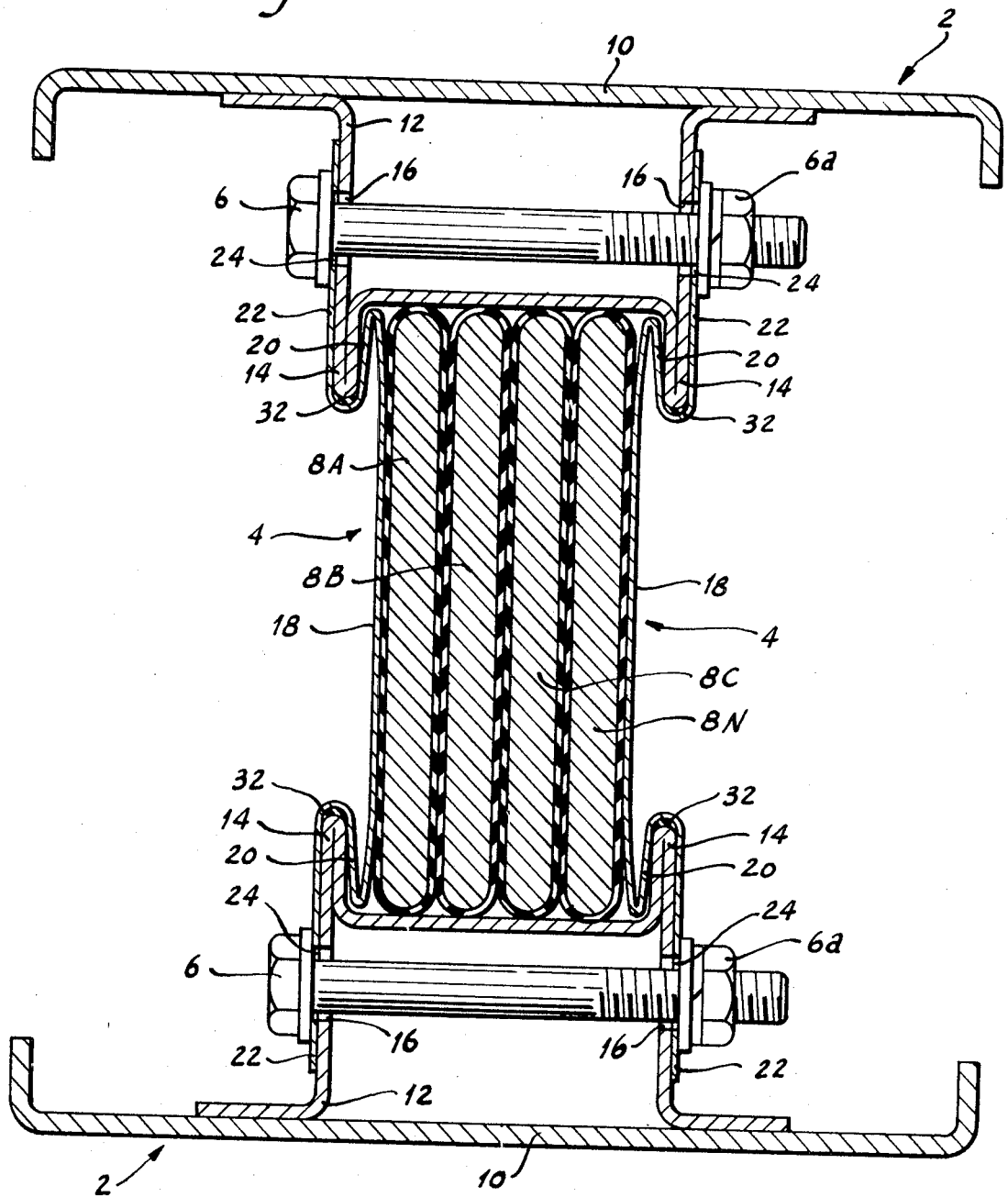

3,639,676

FEEDER BUS DUCT WITH IMPROVED HOUSING STRUCTURE

BACKGROUND OF THE INVENTION

This invention relates to electrical busway structures and more particularly to an improved electrical feeder bus duct.

Busway systems are utilized to carry large amounts of electrical power from one location to another. A primary function of the bus duct used in such systems is to conduct large quantities of current from one point to another in the system in a safe, economical and convenient manner.

Recent designs indicate that a preferred manner of accomplishing the above function is to form the conductors or bus bars into wide flat strips, provide individual insulation for each, group the required number of bus bars tightly together with flat sides adjacent and totally enclose the group within a housing which is in firm contact with at least the opposite flat sides of the group. In designs of this type, the housing structure serves to dissipate the heat away from the bus bars through the intimate, thermally conductive contact with the bus bar group.

It is important that the assembled bus duct structure be designed to have sufficient strength to overcome the high magnetic forces generated under short circuit conditions which act to drive adjacent bus bars apart. To overcome these forces and thereby prevent damage to the bus duct, present designs include one or more extra steps or procedures in the assembly thereof specific to adding strength to the structure, such as wrapping the bus bar group with a high-strength tape, bonding the bus bars and housing members together with an epoxy material, or welding extra pieces between the housing side members to tie the side members together.

The bus duct structure of this invention is designed to incorporate the aforementioned features in an improved housing structure which affords sufficient strength to overcome severe short circuit forces without requiring any additional assembly step specific to increasing the strength. The housing further is designed to compensate for a wide range of tolerance buildups in the bus bar group and to maintain the housing side members in intimate contact with the opposite sides of the bus bar group.

SUMMARY OF THE INVENTION

It is the intent of the invention disclosed herein to provide an improved bus duct structure which incorporates all the present requirements and functions of such structures and is readily and economically manufactured and assembled.

It is a primary object of this invention to provide an electrical bus duct which is assembled of a relatively few separate members by basic assembly practices.

It is a further object of this invention to provide an electrical bus duct of the aforementioned type which affords good thermally conductive contact between the housing and bus bar members.

It is still another object of this invention to provide an electrical bus duct of the aforementioned type which compensates in assembly for adverse tolerance accumulations.

These and other objects and advantages of this invention will become apparent in the following specification and claims when read in conjunction with the accompanying drawings.

BRIEF DESCRIPTION OF THE DRAWING

FIG. 1 is an isometric view of a portion of an electrical feeder bus duct constructed in accordance with this invention;

FIGS. 2a, 2b and 2c are cross-sectional views of the bus duct of this invention showing sequentially various assembly stages of the bus duct; and FIG. 3 is a cross-sectional view of a modified version of a bus duct constructed in accordance with this invention.

DESCRIPTION OF THE PREFERRED EMBODIMENT

Referring to the drawings, the bus duct of this invention comprises a bolt-together metallic housing having top and bottom channel assemblies 2 joined to a pair of side members 4 by bolts 6 to define an elongated rectangular chamber which contains a plurality of wide, flat bus bars 8A, 8B, 8C and 8N. The bus bars are individually insulated in a suitable manner and arranged tightly together with their flat sides adjacent one another to stand on edge within the chamber.

The channel assemblies 2 are identical and each comprise a shallow exterior channel 10 and an edge cap member 12 welded thereto. Cap member 12 is generally an elongated U-shaped channel having flanged outer legs which are welded to the inner surface of channel 10. The bight portion of cap member 12 is offset inwardly toward channel 10 to form outer edge projections or rail portions 14 along its length. Alined pairs of clearance holes 16 are provided at regularly spaced intervals along the leg portions of cap member 12 to receive bolts 6 in assembly of the bus duct.

Side members 4 are also identical and each has an inwardly bowed intermediate portion 18 (FIG. 2a) bounded along the upper and lower longitudinal edges by angularly formed reflex portions 20. A second reverse bend is formed along the outer edges of reflex portions 20 to provide outwardly extending flanges 22 for the side members. The flanges 22 are provided with holes 24 spaced therealong at intervals equal to those between holes 16 of cap members 12 to also serve as clearance holes for bolts 6. The diameter of holes 24 in side members 4 and holes 16 in cap members 12 is exaggerated compared to the customary or normal clearance size for bolts 6 for reasons that will be discussed later.

With reference to the sequential views of FIGS. 2a, 2b and 2c, the assembly of the bus duct will be described to bring out certain features and advantages obtained by the structural shapes aforedescribed. The bus bars are arranged in the compact group as shown in the drawings. The side members 4 are positioned with the bus bar group to have the intermediate bowed portions 18 adjacent the opposite exterior flat sides of the bus bar group as shown in FIG. 2a. The bus bar and sideplate arrangement are then positioned between the jaws 26 of a press which is operated to apply a compressive force on the side members 4 in the area of the reverse bends joining the flange portions 22 to the angular reflex portions 20. This compressive force flattens the intermediate portions 18 somewhat upon the sides of the bus bar group and causes the outer ends of flange portions 22 to move apart. The jaws 26 are provided with bosses 28 which fit between the opposite angular reflex portions 20 in the area of intermediate portions 18 to prevent the angular reflex portions from being compressed flat should an excessive force be erroneously applied to the structure.

The top and bottom channel assemblies 2 are next placed in position with the edge cap members 12 inserted between the respective flange portions 22. The jaws 30 of a second press or similar force-producing means apply a compressive force to the top and bottom channel assemblies 2. As the assemblies 2 move inward toward the bus bar group, the rail portions 14 thereof enter the side members between the angular reflex portions 20 and the flange portions 22. Continued inward movement of the channel assemblies 2 drives the rail portions 14 deeper into the side members 4 and engagement of the leading edge of the rail portions 14 with the respective angular reflex portions 20 cams the latter portion toward the bus bar group to further flatten the intermediate portion 18 thereon and thereby apply a greater compressive lateral force upon the bus bar group.

The top and bottom channel assemblies 2 are forced inwardly by jaws 30 of the second press means until the bight portions of edge cap members 12 seat upon the upper and lower group edges of the bus bars. Bolts 6 are then inserted through the alined clearance holes 16 and 24 to project through the bus duct and have nuts 6a threaded loosely onto the protruding ends. The pressure of secondary press means applied through jaws 30 is then markedly increased to tightly force the bight portions of cap members 12 into intimate contact with the bus bar group and the nuts 6a are tightened upon bolts 6 to securely clamp the bus duct together. The exaggerated clearance holes 16 and 24 readily permit the necessary increment of inward movement of edge cap members 12 upon application of the final clamping force and the same increment of movement transmits a stronger lateral clamping force upon the sides of the bus bars through the camming action of rail portions 14 upon the angular reflex portions 20.

The final assembled bus duct is shown in cross section in FIG. 2c. It is to be particularly noted that the angular reflex portions 20 are not compressed flat to be against the side members and that reflex portions 20 thereby maintain a constant inward force on the bus bar group. It should also be noted that the outer edges of intermediate portions 18 have a small amount of the arcuate bow remaining to add to the inward force being applied on the bus bars. In addition to applying the above-mentioned inward force on the bus bars, the resilient reflex portions 20 and intermediate portions 18 automatically compensate for accumulated tolerances in the bus bar group to accommodate a wide range of overall widths of bus bar groups during assembly. The exaggerated clearance holes 16 and 24 permit the necessary height adjustments to compensate for any adverse tolerances in the bus bars and their insulation in that direction.

Other advantages are afforded the bus duct structure of this invention in addition to those described above. The bus duct structure may be readily sealed against moisture by applying continuous beads of resilient sealing material 32 along the leading edges of rail portions 14 as seen in FIG. 2b. When the bus duct structure is then compressed to its final assembled condition, the bead of sealing material is forced into the juncture crease of flange 22 and angular reflex portion 20 to seal the structure along the entire length as shown in FIG. 2c. The side members 4 are preferably formed of aluminum to improve the heat conduction away from the bus bars. The bend forming the reflex portions 20 on the intermediate portions 18 plus the double thickness of rail portions 14 on cap member 12 readily provide sufficient strength for the bus duct structure to permit aluminum to be employed for the side members. The additional thermally conductive contact of the edge caps with the bus bar group further help dissipate the heat from the bus bars.

A modified form of bus duct utilizing the improved housing of this invention is shown in FIG. 3. The structure is generally referred to as a "multiple-run" bus duct and essentially comprises two bus duct sections stacked one above the other. The duct section shown employs a center channel assembly 34 common to both the upper and lower bus duct. The center channel assembly 34 comprises a shallow channel member 10a identical to exterior channels 10 to which are welded two edge cap members 12a, one along either side, the latter being identical to cap members 12 of the earlier described bus duct. The remaining parts of the bus duct of FIG. 3 are identical to those previously described and have been given the same reference characters. While not shown, it is also contemplated to have a multiple-run section of three bus duct sections wherein two of the center channel assemblies 34 would be required.

We claim:

1. An electrical bus duct structure comprising, in combination:

a plurality of flat elongated bus bars arranged on edge and grouped together with their flat sides adjacent;

housing means including a pair of elongated side members disposed adjacent the opposite exterior flat sides of the group of bus bars and a pair of elongated cap members disposed adjacent the opposite edges of said group of bus bars, said side members having reflex portions formed along the opposite longitudinal edges thereof extending angularly away from said group of bus bars and said cap members each having portions projecting along the opposite exterior flat sides of said group of bus bars to overlie a pair of said reflex portions adjacent the respective cap member to compress said reflex portions toward said group of bus bars and thereby urge said side members and said bus bars tightly together in thermally conductive contact;

insulating means electrically insulating said bus bars from said side members, said cap members and each other; and clamping means securing said cap members firmly against the respective edges of said group of bus bars in thermally conductive contact therewith.

2. The combination according to claim 1 wherein the leading edges of said projecting portions of said cap members engage the outer surfaces of the respective reflex portions to cam the latter toward said group of bus bars in response to movement of said cap members toward said group of bus bars.

3. The combination according to claim 2 wherein said side members are normally bowed inwardly toward said group of bus bars and are compressed substantially flat against the opposite exterior flat sides of said group of bus bars when said projecting portions of said cap members cam said reflex portions toward said group of bus bars.

4. The combination according to claim 3 wherein the overall dimension comprising the wide dimension of a bus bar and the thickness of the insulating means electrically insulating said bus bar from each of said cap members is greater than the dimension across the opposite longitudinal edges of a side member to prevent interference with said cap members when the latter are pressed firmly against the respective grouped edges of said group of bus bars.

5. The combination according to claim 4 wherein:

said cap members are provided with portions projecting away from said group of bus bars and substantially alined with said first-mentioned projecting portions;

said side members are provided with flange portions formed along the outer edges of said reflex portions, said flange portions being reverse bent with respect to said reflex portions to extend along the last-mentioned projecting portions of said cap members, said last-mentioned projecting portions and said flange portions being provided with alined openings therein; and said clamping means comprises bolt means received in said openings to rigidly join said side members to said cap members.

6. The combination according to claim 5 together with resilient sealing means disposed between the leading edges of said first-mentioned projecting portions and the portion of said side members joining said flange portions to said reflex portion, said sealing means being continuous over the entire length of said side members.

7. The combination according to claim 5 wherein said openings in said flanges and said last-mentioned projecting portions are substantially larger than said bolt means to permit said cap members to be moved inwardly toward said bus bars with respect to said side members with said bolt means loosely received in said openings.

8. The combination according to claim 7 wherein said cap members each include a channel member secured along the outer edges of said last-mentioned projecting portions to extend beyond the opposite sides of said housing means, the outer flange portions of said channel members extending inwardly toward the corresponding flange portion on the opposite channel to provide opposed mounting flanges for the structure.

9. The combination according to claim 7 together with:

a second bus duct structure identical to that heretofore claimed, said second bus duct structure being disposed parallel to the first-claimed bus duct structure to have the corresponding last-mentioned projecting portions of each bus duct structure in alined, adjacent relationship over the length thereof, a channel member disposed between the bus duct structures and secured along the outer edges of the said alined and adjacent projecting portions of each bus duct structure to mechanically join the structures along their length; and a pair of oppositely disposed channel members secured along the outer edges of said last-mentioned projecting portions of the respective outer cap members of the joined bus duct structures, said pair of channel members extending beyond the opposite sides of said housing means and having the outer flange portions thereof extending inwardly toward the corresponding flange portion on the opposite channel to provide mounting flanges for the joined structure.

* * * * *